Nov. 28, 1961  J. R. HARKNESS  3,010,325
MOVABLE MASS AND FRICTIONLESS SUPPORT MEANS THEREFOR
Filed April 15, 1958
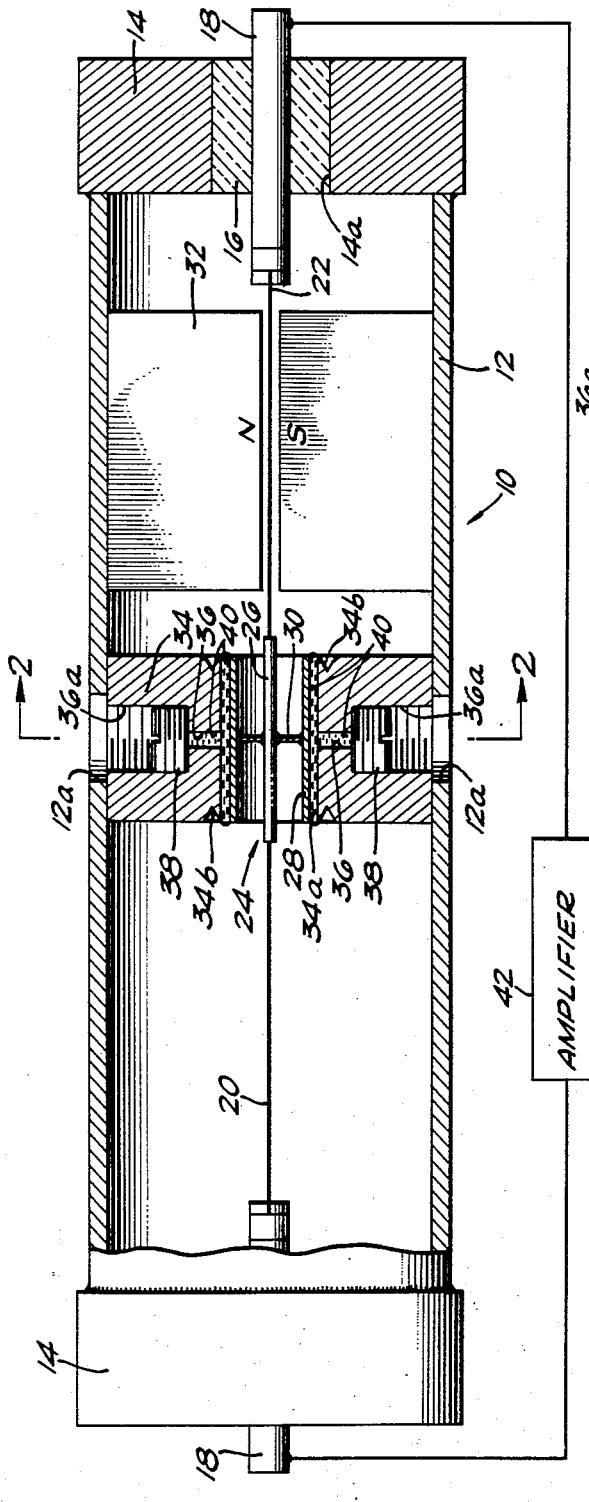
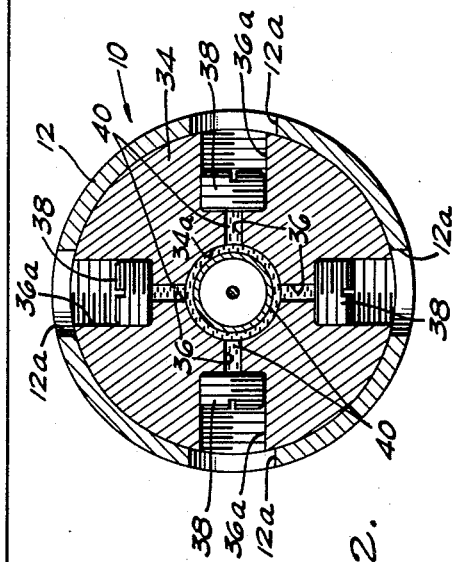
JOHN R. HARKNESS
INVENTOR.
BY
ATTORNEY United States Patent Office 3,010,325
Patented Nov. 28, 1961

3,010,325
MOVABLE MASS AND FRICTIONLESS SUPPORT
MEANS THEREFOR
John R. Harkness, Laguna Beach, Calif., assignor to Borg-Warner Corporation, Chicago, Ill., a corporation of Illinois
Filed Apr. 15, 1958, Ser. No. 728,674
4 Claims. (Cl. 73—517)

The present invention pertains to frictionless support or bearing means for a movable mass and more particularly, to means for supporting a seismic mass while nevertheless permitting substantially frictionless movement thereof in either of two opposite directions.

In certain fields of endeavor, as for instance the field of precision instrumentation, it is often necessary to transform changes in certain prescribed conditions or effects, such as temperature, pressure, velocity, etc., into finite mechanical movements of certain parts or components of a device used for sensing such condition or effect. Only in this manner is it possible to analyze certain conditions or to use the changes in such conditions as a means for automatically controlling the operation of other devices. However, such condition sensing devices can be no more sensitive, accurate or precise in operation than the ability of such instrument to be unaffected by all conditions other than the precise condition under consideration. In this regard, heretofore it has been extremely difficult, if not impossible, to provide a mechanism wherein only the particular force or other condition under consideration has had a consequential effect on the degree of movement of the particular parts or components of the condition sensitive device in question. This, of course, has been due to the fact that such moveable parts or components have weight and mass and as such, were influenced by gravitational forces thus requiring support means of one kind or another. The support means previously used have been such as to require the force acting on the movable parts to first overcome certain outside forces and effects, such as frictional forces, which merely constrain the movable parts against movement of any kind. Such inefficient support means have had a marked detrimental effect on the correlation between the degree of movement of such mass and the amount of force or other condition under consideration.

It is therefore an object of this invention to provide support means for a mass whereby such mass is permitted substantially frictionless movement.

Another object is to provide for a mass, support means as characterized above utilizing a lubricant having a relatively high cohesive strength.

Another object is to provide for a mass, support means as characterized above for permitting substantially frictionless movement of the mass in either of two opposite directions.

Another object is to provide a mass and support means therefor as characterized above in combination with an extremely sensitive vibrating wire device for accurate measurement of conditions which effect movement of said mass.

Another object of this invention is to provide a mass and support means therefor as characterized above in an accelerometer for accurate measurement of acceleration and deceleration.

Another object is to provide a mass and support means therefor as characterized above wherein displacement of the lubricant is prevented due to the tendency of such displacement to tend to draw a partial vacuum within said lubricant.

The novel features which I consider characteristic of my invention are set forth with particularity in the appended claims. The device itself, however, both as to its organization and mode of operation, together with additional objects and advantages thereof will best be understood from the following description of a specific embodiment when read in connection with the accompanying drawings, in which FIGURE 1 is a longitudinal sectional view of a vibrating wire device incorporating a condition sensitive mass and novel support or bearing means therefor, and FIGURE 2 is a transverse sectional view of the device shown in FIGURE 1 taken substantially along line 2—2 of FIGURE 1.

Like reference characters indicate corresponding parts throughout the several views of the drawings.

Referring to FIGURE 1 of the drawings which show a preferred form of the present invention, numeral 10 designates a vibrating wire condition sensing device or transducer which is capable of converting changes in force into changes in a given characteristic of an electrical signal as will hereinafter appear in detail.

Transducer 10 comprises a housing or enclosure member 12 which, in the preferred form as shown in FIGURE 1, is generally tubular in shape and formed of any suitable nonmagnetic material. Fixed to each of the opposite ends of member 12 as by welding, brazing, or soldering, is an end wall member 14. Each of the end wall members 14 is formed with a central opening 14a wherein is secured a glass mounting member 16 for an electrically conductive mounting pin 18.

Positioned within enclosure 12 and fastened to the inwardly extending ends of the mounting pins 18 is a structure comprising substantially identical electrically conductive strings or wires 20 and 22, and a seismic mass 24. One end of each of the wires 20 and 22 is fixed to a separate one of the pins 18, the other ends of such wires being attached to an electrically conductive mounting pin 26 which is a part of seismic mass 24. Mass 24 also comprises a thin-walled tubular member 28 which is rigidly fixed to pin 26 by means of a web-like member 30 formed of electrical insulating material. It is preferable that mass 24 be of considerable longitudinal length and outside diameter so that the ratio of the outer peripheral area or bearing surface of a seismic mass 24 to its total weight is relatively large.

Mounted within enclosure 12 is a U-shaped permanent magnet 32 having its north and south poles positioned on opposite sides of vibratory string 22.

Seismic mass 24 is supported within enclosure 12 by support means comprising a bearing member 34 fastened to enclosure 12 by any suitable means such as welding, brazing or soldering. Bearing member 34 is formed with a generally cylindrical central opening 34a and arcuately shaped endless grooves 34b immediately adjacent each of the ends of the wall of opening 34a. In communication with opening 34a are four equally spaced radially extending orifices 36 having enlarged end portions 36a which open to the exterior of transducer 10 through suitable openings 12a formed in enclosure 12. Each of the enlarged end portions 36a is provided with fastening means such as fastening threads for threadably receiving an adjustable hermetic sealing means such as screw 38. In the form of the invention shown in the drawing, each of the screws 38 is formed with a screw driver kerf to facilitate adjustment of the position of such screws for a purpose to be hereinafter explained.

Completely filling each of the orifices 36 from the central opening 34a to the respective hermetic sealing means 38, and completely surrounding seismic mass 24 within opening 34a of bearing member 34 is a unitary mass of lubricating fluid 40 characterized by having a relatively high cohesive strength, as, for instance, any one of the Dow Corning silicone oils, the viscosity of which measures 1,000 centistokes or higher. For successful practice of the present invention, it is essential that the lubricating fluid be so positioned within the various orifices 36 and about the seismic mass 24 that all foreign particles and substances, such as air, be completely removed and replaced by such lubricating fluid of high cohesive strength. Under these conditions, the lubricating fluid about mass 24 will not flow out of opening 34a of bearing member 34 since any tendency to so leave the space between mass 24 and the wall of opening 34a will be counterbalanced by a tendency to draw at least a partial vacuum within the orifices 36. This is due, at least in part, to the cohesive nature of the fluid which causes it to flow as a single unitary mass, and since there is no way for air or any other medium to replace such fluid within the orifices, such movement or tendency to move creates or tends to create a partial vacuum within the orifices 36. The force of this vacuum is always greater than the force acting on the lubricant to cause it to flow out of the opening 34a. In this manner, the lubricating fluid is always retained within opening 34a and about mass 24. Also the arcuate grooves 34b at the opposite ends of bearing member 34 form angles in the paths which the fluid would follow in leaving acute opening 34a thereby causing the cohesive strength of the lubricating fluid to clearly dominate any tendency of such fluid to leave opening 34a by its adherence to bearing member 34. Further should the mass of lubricating fluid 40 be positioned so close to the ends of the wall of opening 34a as to create a likelihood that such fluid will be influenced by forces other than gravity and hence will flow out of the end of opening 34a, it is merely necessary to effect suitable adjustment of one or more of the adjustable sealing means or screws 38 so as to effectively draw more of the lubricating fluid within the respective orifices. This too is due in part to the cohesive strength of the lubricating fluid whereby such fluid tends to move as a single unitary mass rather than permitting any other medium, as for instance air, to displace a portion thereof.

As will be readily appreciated, the aforedescribed combination of bearing member 34 and its associated parts affords firm support for seismic mass 24 while nevertheless permitting substantially frictionless movement thereof. Although such support or mounting means may be used in conjunction with any suitable mass to be moved, it has been shown in the drawing and described above as a means for supporting an acceleration and deceleration sensitive mass which cooperates with strings or wires 20 and 22. That is, connected in circuit with strings 20 and 22, and electrically conductive pin 26 of seismic mass 24, as by means of suitable conductors connected to pins 18, is an electronic amplifier 42. Amplifier 42 cooperates with vibratory string 22 such as to feed back to string 22 an electrical signal or current which maintains the string in vibration at a frequency corresponding to the stress or tension thereof. String 22, in turn, generates an electrical signal which is fed to amplifier 42, wherefore the transducer 10 and amplifier 42 cooperate to afford an oscillator. The electrical current or signal which passes through wire 22 from amplifier 42 creates a magnetic field about said wire 22, such magnetic field reacting with the magnetic field afforded by permanent magnet 32 to create a transverse force which maintains wire 22 in motion. In like manner, movement of wire 22 in a direction transverse to the magnetic field afforded by permanent magnet 32 generates a current flow in wire 22 which is conducted to amplifier 42. In this manner, wire 22 is maintained in vibration at a frequency corresponding to its stress or tension since the frequency of the output of amplifier 42, which is fed to wire 22, is determined by the frequency of vibration of such wire. It is thus seen that by reading the frequency of the output signal of amplifier 42, as by any means well known in the art, an indication is afforded of the stress or tension of vibratory wire 22.

As the tension of wire 22 is varied as by movement of mass 24 in response to variation in any predetermined force or effect, an indication is afforded of the change in such force or effect merely by noting the change in frequency of output signal of amplifier 42. However, in order to effect the most exact correlation between such variation in force and variation in frequency output of the amplifier, the seismic mass is so mounted and supported as to be movable substantially free of all frictional forces. Thus, as mass 24 moves with respect to bearing member 34, as for instance by acceleration or deceleration of transducer 10, virtually all of the force applied to the mass is employed in varying the tension of wire 22, the wire 20 acting as a biasing member or spring against such force.

Although I have shown and described certain specific embodiments of my invention, I am fully aware that many modifications thereof are possible. My invention, therefore, is not to be restricted except in so far as is necessitated by the prior art and by the spirit of the appended claims.

What I claim is:

1. In a force measuring device, the combination of a force responsive element, a vibratory string connected to said element, means affording said string an initial stress and disposing said string such that movement of said element causes variation in the stress of said string, substantially frictionless support means for said element comprising a bearing member having an opening for loosely receiving said element, said bearing member being formed with at least one orifice extending outwardly from and communicating with said opening, lubricating fluid filling at least a portion of said orifice and surrounding said element within said opening, said support means further comprising means for hermetically sealing said orifice to cause any tendency of said fluid to flow out of said opening to tend to create a partial vacuum within said orifice whereby said fluid is retained about said element within said opening to permit substantially frictionless movement of said element within said opening in response to variation in force on said element, and means for vibrating said string in accordance with its stress.

2. In a force measuring device, the combination of a force responsive element, a pair of vibratory strings each of which is connected to said element, means affording each of said strings an initial stress and disposing said strings such that movement of said element in a given direction causes equal and opposite variations in the stresses of said strings, substantially frictionless support means for said element comprising a bearing member having an opening for loosely receiving said element, said bearing member being formed with at least one orifice extending outwardly from and communicating with said opening, lubricating fluid filling at least a portion of said orifice and surrounding said element within said opening, said support means further comprising means for hermetically sealing said orifice to cause any tendency of said fluid to flow out of said opening to tend to create a partial vacuum within said orifice whereby said fluid is retained about said element within said opening to permit substantially frictionless movement of said element within said opening in response to variation in force on said element, and means for vibrating one of said strings in accordance with its stress.

3. In a force measuring device, the combination of a force responsive element having a large surface to weight ratio, a pair of vibratory strings each of which is connected to said element, means affording each of said strings an initial stress and disposing said strings such that movement of said element in a given direction causes equal and opposite variations in the stresses of said strings, substantially frictionless support means for said element comprising a bearing member having an opening for loosely receiving said element, said bearing member being formed with a plurality of orifices communicating with said opening, lubricating fluid filling at least a portion of each of said orifices and surrounding said element within said opening, said support means further comprising hermetic sealing means for each of said orifices in direct contact with the fluid respectively therewithin to cause any tendency for said fluid to flow out of said opening to tend to create a partial vacuum within said fluid whereby said fluid is retained about said element within said opening to permit substantially frictionless movement of said element within said opening in response to variation in force on said element, and means for vibrating one of said strings in accordance with its stress.

4. In an accelerometer, the combination of a seismic mass having a generally cylindrical surface and a large surface to weight ratio, a pair of vibratory strings each of which is connected to said mass, means affording each of said strings an initial stress and disposing said strings such that movement of said mass due to inertia force thereon causes equal and opposite variations in the stresses of said strings, substantially frictionless support means for said mass comprising a bearing member having a cylindrical opening for loosely receiving said mass, said bearing member being formed with a plurality of equally spaced orifices communicating with said opening, lubricating fluid filling at least a portion of each of said orifices and surrounding said mass within said opening, said bearing member being formed with two endless arcuately formed grooves providing an acute angle in said bearing member immediately adjacent each of the ends of the wall of said opening to minimize adherence of said fluid with surfaces contiguous with the wall of said opening, said support means further comprising hermetic sealing means for each of said orifices to cause any tendency of said fluid to flow out of said opening to tend to create a partial vacuum within said orifice whereby said fluid is retained about said mass within said opening to permit substantially frictionless movement of said mass within said opening in response to variation in inertia force on said mass, and means for vibrating one of said strings in accordance with its stress.

References Cited in the file of this patent

UNITED STATES PATENTS

| | | |
|---|---|---|
| 1,371,022 | Ecaubert | Mar. 8, 1921 |
| 1,546,075 | Horn | July 14, 1925 |
| 1,621,129 | Mueller et al. | Mar. 15, 1927 |
| 1,676,902 | Jones et al. | July 10, 1928 |
| 2,293,134 | Hallenbeck | Aug. 18, 1942 |
| 2,407,037 | Sowa | Sept. 3, 1946 |
| 2,725,492 | Allan | Nov. 29, 1955 |
| 2,884,282 | Sixsmith | Apr. 28, 1959 |

FOREIGN PATENTS

| | | |
|---|---|---|
| 729,894 | Germany | Dec. 19, 1942 |